United States Patent [19]

Pahl

[11] 4,008,032

[45] Feb. 15, 1977

[54] DEVICE FOR THE CYCLIC MANUFACTURE OF MOLDED PARTS

[76] Inventor: Karl-Heinz Pahl, Leuchtenberger Kirchweg 101, 4 Dusseldorf, Germany

[22] Filed: Mar. 14, 1975

[21] Appl. No.: 558,388

[30] Foreign Application Priority Data

Mar. 20, 1974 Germany .................. 2413317

[52] U.S. Cl. ........................... 425/246; 425/247; 425/251; 425/DIG. 228; 249/120; 249/126; 249/164

[51] Int. Cl.² .................. B29C 1/16; B29F 1/00; B29G 3/00

[58] Field of Search ... 425/246, 247, 251, DIG. 228; 249/126, 120, 168, 169

[56] References Cited

UNITED STATES PATENTS

| 2,476,558 | 7/1949 | Moxness | 425/251 |
| 2,724,865 | 11/1955 | Mills et al. | 249/126 |
| 3,327,352 | 6/1967 | Osgood | 425/247 |
| 3,455,373 | 7/1969 | Bedell | 249/126 |
| 3,506,061 | 4/1970 | Clemm | 249/126 |
| 3,621,533 | 11/1971 | Bertrandi | 425/246 |
| 3,786,857 | 1/1974 | Sutherland | 249/126 |

Primary Examiner—Ronald J. Shore
Attorney, Agent, or Firm—Burgess, Dinklage & Sprung

[57] ABSTRACT

A process for producing shaped parts from synthetic and similar workable materials by filling molds under pressure, hardening and removing the articles from the molds. Movable, essentially identical mold carriers are provided with article-related mold inserts preselected for the work cycle and locked in place in the carriers. The forming tool is filled with the synthetic, it is exposed for a given time to certain temperature and pressure conditions, the tool is opened and the inserts are expelled. The form carriers are then outfitted with another set of form inserts while the first set of mold inserts are removed from the molding cycle.

7 Claims, 7 Drawing Figures

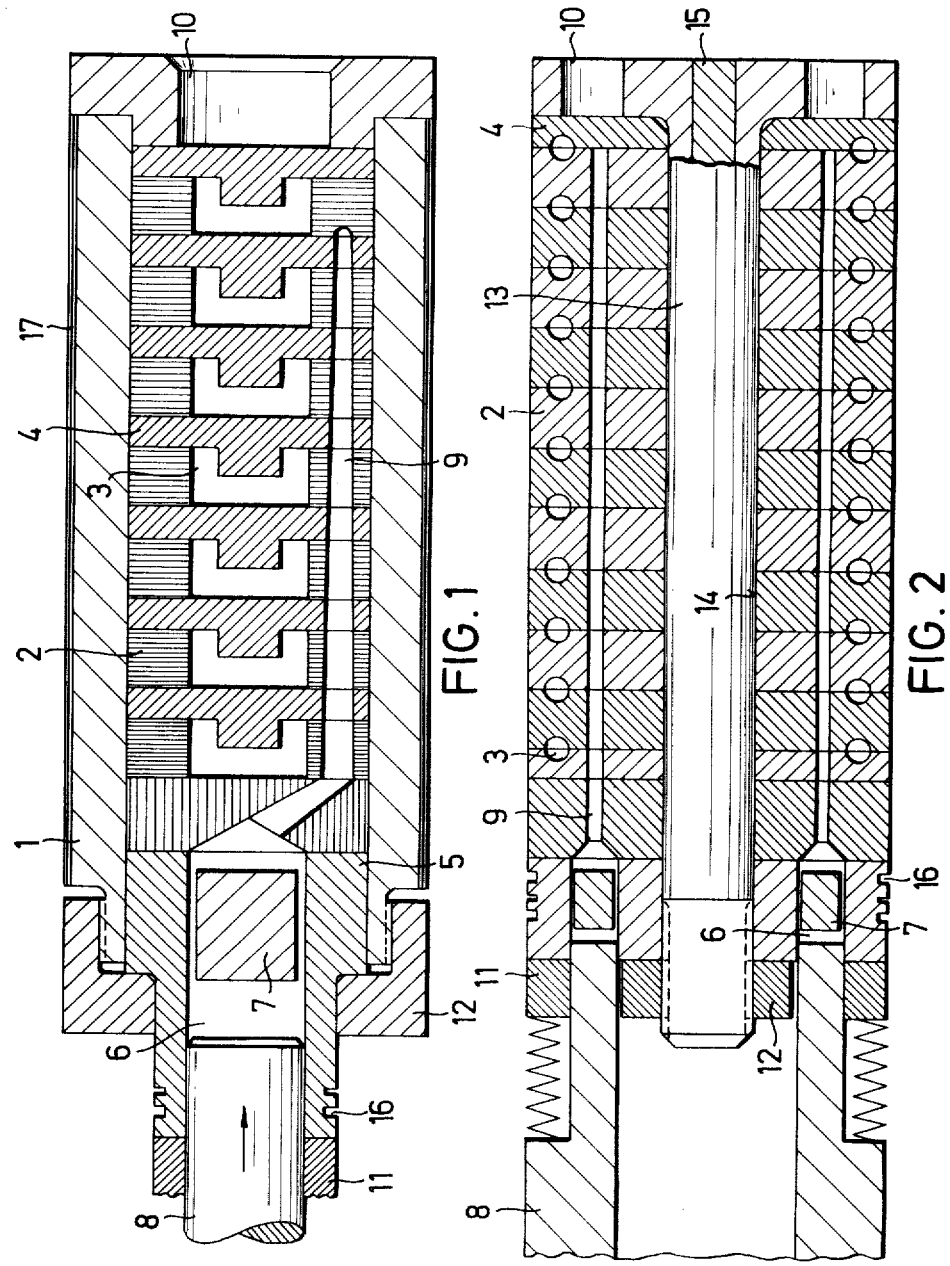

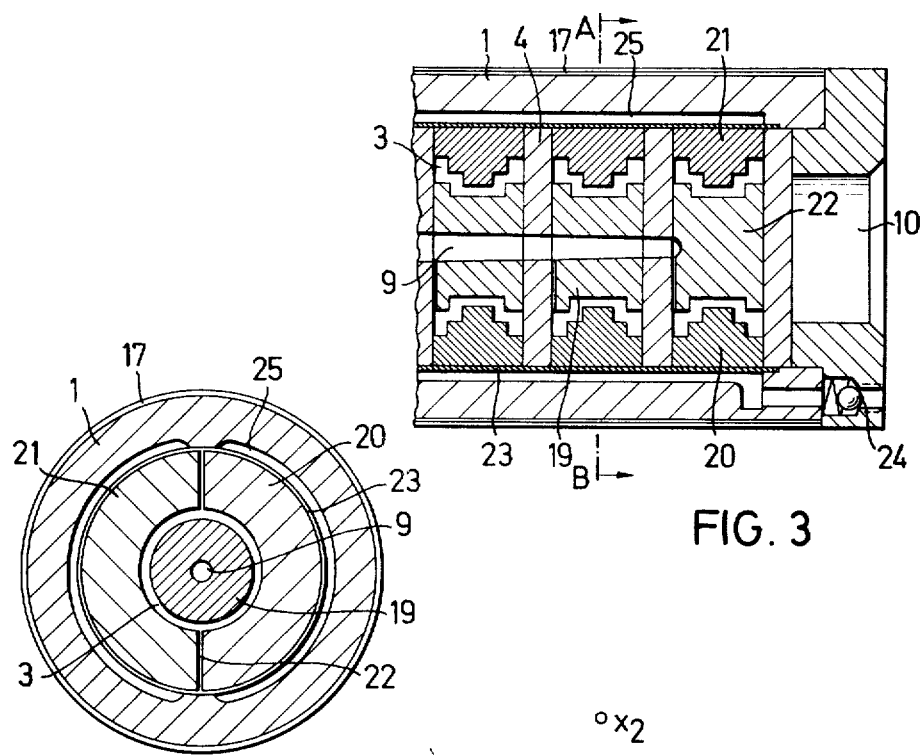
FIG. 3
FIG. 4
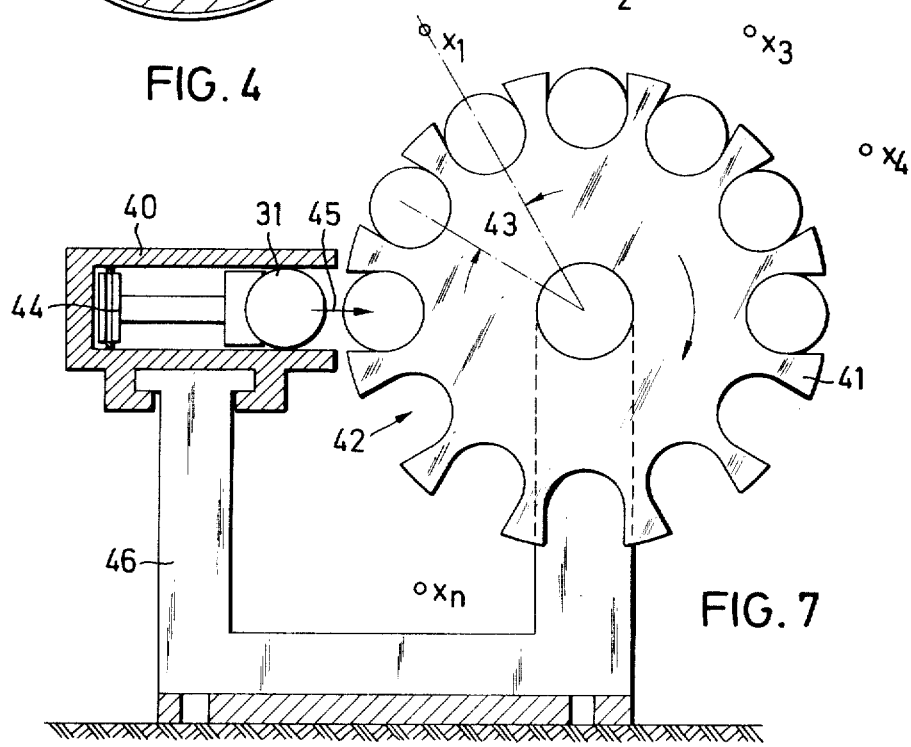
FIG. 7

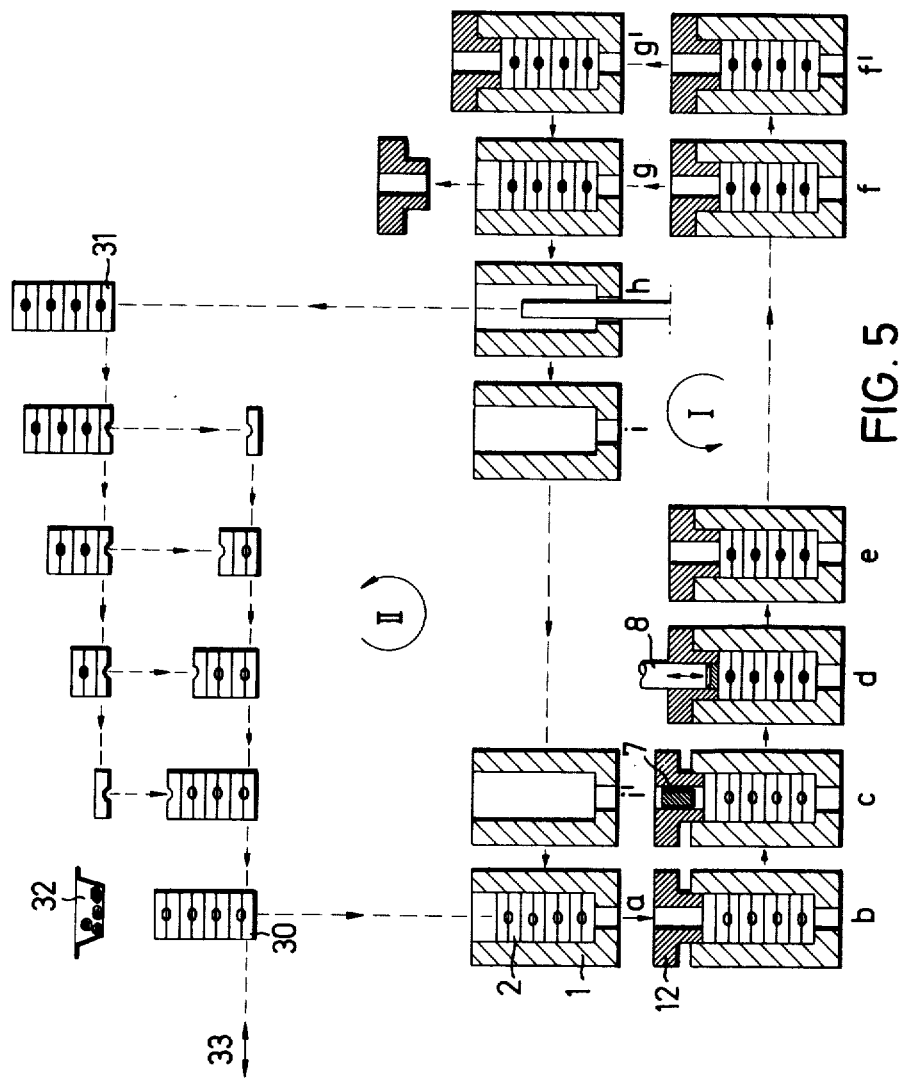

DEVICE FOR THE CYCLIC MANUFACTURE OF MOLDED PARTS

BACKGROUND

The present invention relates to a process for producing shaped parts from synthetic and similar workable materials and a device for the production of shaped parts.

With the present state of development of process technology for formed articles from elastomers and similar workable materials, there are, in principle, two ways of increasing economy of operation. One is the chemical-thermic way, applying the Vant't Hoff Rule, according to which the reaction speed of interlacing doubles with every 10° of temperature increase. The second is another manufacturing process which seeks to optimize all other process parameters. The sum of these two approaches results, among others, in multistation installations fed by spraying machines, which method is the most economical method so far, but only for the large-quantity production of formed articles. ("Gummi-Asbest-Kunststoffe," 1971, pp. 460 – 466 and 468).

Depending on the tool design and the feeding of blanks, three processes can be distinguished in the manufacture of formed articles:
 a. the compression process
 b. the transfer process
 c. the injection process.

Articles where rework to remove lateral waste (flash) is expensive are to advantage produced by methods b or c.

At the present time, the most popular machine for the production of formed articles is the single press of vertical or horizontal design with single or multiple stories (levels). It comprises a mounting table for the rigidly installed forming tools which are replaced after the desired production quantity is reached. The mounting table limits the number (corresponding to the article dimensions) of engravings or "nests" which are located in the form separation plane.

Every single press, also referred in the technical literature as forms carrier, is to be considered as an independent aggregate, since on it all machine parameters such as lifting, lowering, pressure, temperature and time can be set individually. The advantage of such a type of manufacturing is the simple adaptation to the multiplicity of products manufactured; its disadvantage is the exclusive single usage of identical or similar machine and control elements of which several are available. With the round-table principle to accommodate several of the above-mentioned single presses, there was recently created a manufacturing method which offers considerable economical advantages in the manufacture of large quantities.

The forms are filled by an injection aggregate and travel step-by-step during the heating or cooling interval to the mold release station. This means that, aside from the desired production figures, the necessary heating time of a specific product determines the selection of the most economical number of presses on the round table. Furthermore, the large mass of several single presses to be moved limits at the present time the size of the round table to a maximum of 10 form carriers with a total weight of over 100 metric tons.

Also with the round-table installations, the advantage of low article production cost entails the disadvantage of high capital investment and, above all, poorer flexibility. The injection unit of a multi-station installation can simultaneously process only one material, while as a rule a production enterprise uses a large number of different mixtures at the same time.

The two described processes for the manufacture of formed articles, of small- and medium-size production in single presses, and the large-scale production in multi-station installations, have in common one important criterion: For each forming tool in usage, one press must be available as form carrier. In each case, the form carrier must be adjustable individually in order to transmit pressure and temperature to the tool via a given displacement/time program.

If, for instance, in a plant ten articles with small lot sizes must be produced at the same time, they usually require, in addition to the tools, ten similar single-stage presses and ten machine controls operating independent of one another. However, when dealing with large production runs, to be produced on ten round-table installations with ten stations, one requires a total of one hundred forming tools in 100 presses with 10 controls. In both cases, each forming tool, depending on article size and pressing process, contains up to 100 and more form nests which after opening the press at the end of the heating cycle are mostly removed by hand. Equally time consuming is the usually following deburring of the formed article so manufactured.

THE INVENTION

It is the object of the invention to combine the flexibility of individual manufacture in a large number of individually operated presses with the quality and performance advantage resulting from the rigid cycle times of the multistation installations. It should be possible to handle any production program, changing rapidly and frequently, in only one installation of variable capacity where through consistent multiple utilization of specific processing machine elements (e.g., device for breaking open the forming tool at the end of the heating period) the capital investment required for total production can be reduced to a minimum. If ten articles must be produced at the same time by such an installation, this should take place independently of the prevailing lot sizes for each article and with the use of only one control, one closing pressure press, one break-open device, one temperature pre-select device, etc.

Another object of the present invention is, by a suitably modified design of the forming tools, suitable for standardization of the dimensions, to reduce the costs for their manufacture and repair. In addition, by splitting the share of the forming cost (usually borne by the purchaser) into a part applicable to the installation and one applicable to the article, this cost is reduced once more. The form design, independent of the article shape, should be suitable for automatic removal from the mold and deburring. This design, through agility, i.e., turning away from the rigid built-in principle, should make it possible to reduce the present high costs for form exchange and storage.

The subject of the present invention is a process for producing shaped parts from synthetic and similar workable materials by filling the form (mold) under pressure, hardening and removal from the mold wherein freely movable, essentially identical form carriers are provided with an article-dependent form (mold) insert preselected for the work cycle and locked under closing pressure, the forming tool is filled with the synthetic, it is exposed for a given time to certain temperature and pressure conditions, the forming tool (mold) opens, expels the form insert, equips the form carrier with another form insert and releases the removed form insert independent of the form carrier cycle.

Synthetics which can be processed by this method into shaped parts are generally thermoplastics, thermosetting plastics or rubber (caoutchouc) mixtures. These materials may also be foam materials and their components may be mixed immediately before filling the forming tools (molds) or inside them. The process is intended mainly for the manufacture of shaped parts from natural or synthetic rubber mixtures. Among these are the elastomers on a base of chloroprene, nitrile, butyl, hypalon, cis-1, 4-butadiene and cis-isoprene, as are the styrol-butadiene quality and their blends, the super-refined rubber types on a fluorine and silicon base and terpolymers. The synthetic processable by this method may contain the conventional filling materials, pigments, stabilizers and other additives. Likewise, it is possible, by inserting suitable cores from other synthetic material or metal, to produce sandwich elements and multi-layer compound designs.

The forming tools of the present invention are divided according to their functions into a part belonging to the production installation, the form carriers and the associated form insert which depends on the article. Preferably, all form inserts of a production installation have the same outside dimensions for placement into similar form carriers. The purpose of the form carrier is the transport of the form inserts to the various processing stations such as filling, heating, etc. It is used to contain the closing force as inner force (locking), through which the forming tool as a unit becomes independent of location, and for accommodating the heater elements and the temperature control which can be programmed anew for each cycle. The form carriers are expediently provided with an adjustable coding which determines the production cycle as a function of material and article. This code also indicates the type of material, the material dosage, the temperature program, dwell times, place for removal from the mold and other values important for the automatic control of the production cycle.

Also the production installation is layed out in such a way that the forming tools freely movable therein for any articles in any sequence for different article size and shape, different heating periods, closing pressures, etc. are exposed to optimum conditions during each work cycle. Influencing the pre-programmed work cycle by the operating personnel is made impossible and optimum reproducability of the heating periods and temperatures of every article is assured.

The purpose of the form inserts, which are in the shape of forming disks or forming rings, is the shaping of the article and the delivery of the material to be shaped via injection channels to the form nests or cavities. Form carriers and form inserts are joined to a forming tool only during a work cycle in a detachable manner. During the following work cycle, the same form carriers are not necessarily joined with the same form inserts. The forming tools are freely movable and can leave the production installation at various phases of the work cycle, e.g., for removal of the finished article, or remain there as long as desirable according to the material properties or in view of the article to be manufactured, or for the most economical utlization of the installation. As a result, there are no costs for changing forms (setup times) and shutdown costs which are unavoidable with form molding presses including automatic rubber injection molders.

Another subject of the present invention is a device for implementing this process with a device for step-by-step feeding of form carriers equipped with form inserts, devices for closing, filling and opening the forming tools characterized by identical form carriers not rigidly connected to the feeding device 1 for holding the associated, article-dependent form inserts 2 exchangeable for each work cycle, a device for closing (d) and opening (g) of the forming tools, a device (h) for the separation of form inserts and form carriers at the end of the work cycle, for removal 46 from the mold and a device (a) for joining the form carriers with preselected form inserts.

The process of the present invention and the design of the forming tools will be described below by means of the accompanying drawings.

FIG. 1 shows a cross section of a form carrier with a stack of forming disks on the inside. For clarification it also shows a blank and a pointed plunger in a position corresponding to the instant before filling the form.

FIG. 2 shows a cross section in the same condition and at the same point of time of a form carrier with form disks or rings stacked on the outside as is expedient for articles with larger dimensions.

FIG. 3 shows a section of part of a form carrier according to FIG. 1, but with an installed radially acting (taper) clamping sleeve for use with split form disks.

FIG. 4 shows a section taken along A — A of FIG. 3.

FIG. 5 shows a sequence of possible circumstances or positions of a single form carrier and stack of form disks on its way through the production installation.

FIG. 7 shows an automatically operating mold release station according to the round-table principle with the associated device for separately feeding the form disks of a stack of form disks.

Figure 6:
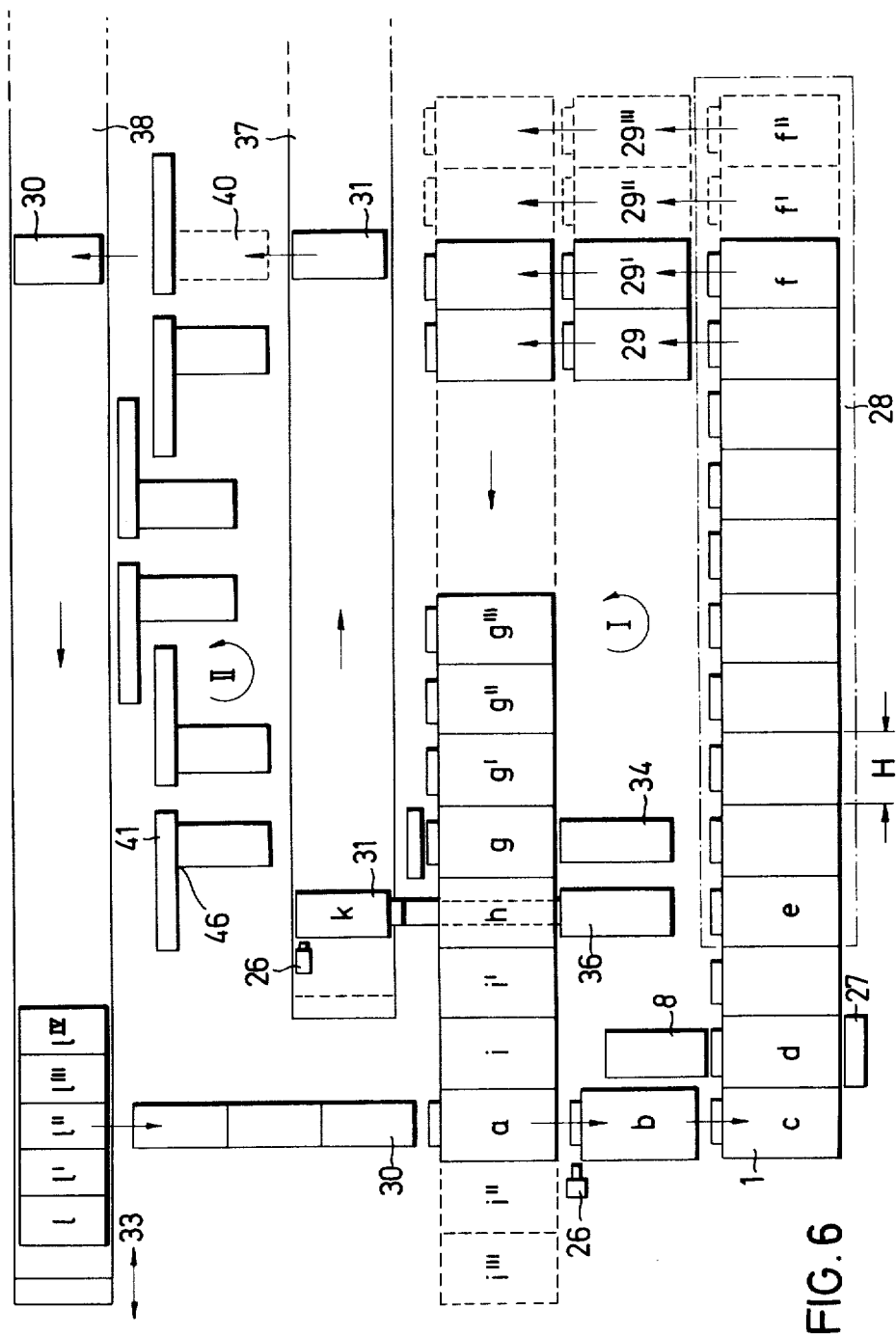
FIG. 6 shows a top view of a schematic of a production installation for using a large number of forming tools passing through the installation.

The forming tools proper are functionally divided into two mating parts. The parts 1 assigned to the production installation are logically designated as form carriers (FIG. 1). They serve as transporting means for the second part of the form (mold), the successive stacks of article-dependent form disks 2. The form disks 2 can be located inside the form carrier 1 (FIG. 1) or on its outside (FIG. 2). They are expediently shaped as circular disks or as circular ring. Their height depends on the article dimensions 3 while all other outside dimensions are independent of the article. In this manner, any stack of form disks fits into any form carrier of a production installation since the total height of the stack is determined by the height of the distance disks 4.

The front end of the form carrier comprises an injection cylinder 5 with a borehole 6 for accommodating the blank 7. By means of press plunger 8 (belonging to the installation), the blank is pressed via injection channels 9 into cavities 3 of the form disks 2. The scraper ring 11 for excessive blank material simultaneously serves as press pad. In place of this method, known as transfer method, of feeding the forms, one can also connect an injection aggregate directly at 5 (injection process).

For the preferred production of articles with larger outside dimensions or predominantly ringlike cross section the type of form carrier design shown in FIG. 2 is advantageous. To accommodate the form disks 2, one uses in this case one or several plungers 13 on which the form disks with clearances 14 are stacked. After releasing the interlock 12, the form disks can be pushed out via holes 10.

If the shape of the article, e.g., by undercutting at their outside contour or by the existence of a form core 19, requires a splitting of the form disks 2 into two semicircular segments 20 and 21 along line 22 (FIG. 3 and 4) in order to release the finished article from the mold, there must be exerted, in addition to the axial closing pressure, a radial pressure force on the form disks. This can be accomplished, e.g., by a hydraulically actuated membrane 23 which in this case forms the inside surface of the form carrier and acts as a spring collet. Before feeding the blank, a hydraulic fluid can be introduced via a nonreturn valve 24 into the pockets 25 located behind the membrane and discharged again after the heating period for the article. As a result, axial and radial closing forces are internal forces of the form carrier, and therefore it becomes independent of location, i.e., freely movable during a work step. The possibly required heating energy is transmitted, for example, via wiper contacts to heating rods 15 or heater strips 17.

The operation of an installation for the manufacture of formed articles with suitably shaped tools is shown in the top view of FIG. 5. It is a schematic of the path of a single form carrier during a full work cycle. All other tool sets travelling at the same time through the installation were not shown, for clarity's sake. Therefore, FIG. 5 shows only a spatial sequence of possible conditions of a single form located in the installation, while FIG. 6 shows a schematic of a whole installation with a number of widely varying forming tools.

Essentially, the installation comprises two separate conveyer systems I and II whose extent can, within limits, be adapted to the desired production capacity. The main cycle I is similar in design to an interlinking system between machine tools and transfer streets. Instead of the pallets transported there in fixed cycle operation, here form carriers 1 according to FIG. 1 through 3 are transported through the various processing stations. Cycle II is a similar conveyer system for transporting the form disk inserts, expelled at the end of the heating period from the form carrier, to the removal-from-the-mold location and back to the start of cycle I.

A closed working cycle proceeds as follows:

At $a$ a prepared stack of form disks 30 is moved in a form carrier taken from storage $i$ and preheated along the path $a-c$. At $b$ the front end of the form carrier with the axial interlock 12 is attached. Via a suitable control, a foolproof blank feed can be effected at $c$. The mixture 7 injected at $d$ via an injection plunger 8 or worm extruder into the cavities 3 of the form disks is heated in storage $e-f$ to form the finished article. After passing the given dwell time in the storage, the form carrier is opened at $g$, the form disk package is expelled at $h$ and the empty form carrier is transported to storage $i$.

The ejected form disks 31 traverse from $h$ to $a$ a path II separated from I. They were separated step-by-step, the finished article was removed, deburred, sorted and packaged 32. After removing the injection channels 9, the form disks are again assembled in the same sequence into a stack 30 and, upon a control signal, are returned at $a$ into the installation.

The removal-from-the mold locations are expediently separated according to article groups, so-called parts families, in order to remove fully automatically a maximum number of products with the same device. This can proceed, for example, according to the roundtable principle (FIG. 7). After expelling the form disk stack 31 at the end of the heating period, it is transported via an aiming control to the pick-up device 40 of the removal-from-the-mold location. With every step 43 of the indexing drum 41 of the round table, the top form disk is removed by means of the ejection device 44 from the stack (arrow 45) and moved one step further. During the course of a full rotation of indexing drum 41, each form disk is successively moved past fixed work stations ($x_1 - x_n$) where the article can be deburred, removed from the mold, checked and the form disk can be cleaned again. At the end of a full rotation of the indexing drum, the form disks are again introduced into the pick-up device 40 and hence reassembled in the same sequence into a stack 31. If, owing to wear or defect, the exchange (replacement) of one or several form disks becomes necessary, this is easily possible at a location 42 provided for this purpose on the round table.

If the desired article quantity has been produced after the planned number of rotations, the forming tools no longer needed, without disturbing the entire installation, can be removed at location 33 in FIG. 5 and 6 from cycle II. From there, they can be moved in a suitable bin and by means of a suitable transport system to an addressable storage location, from where they can be picked up, if needed, automatically and reintroduced to the installation.

The simple "maneuverability" of the forming tools, as contrasted with their rigid installation in conventional presses, can be effectively utilized by a process computer control of the whole installation. By marking the forming tools at a suitable location, e.g., by means of coded rings, grooves or such items 16, which can be read by associated reading devices at the various work stations, the positions of the forming tools contained in the installation at any one time are known. If the start of the working cycle of each form disk package 30 at $a$ can be influenced with respect to time and sequence in relation to other uses (FIG. 6), by feeding in different priorities for each article, optimum manufacturing control can be achieved for any order situation.

This relates not only to the article assortment which varies from day to day, but also to the total production of finished products. By providing storage zones at suitable locations, the installation can "breathe", so that by changing the cycle time of cycle I, by adding available form-removal locations of cycle II, the production volume can be varied within wide limits nearly continuously and without set-up costs. Such storage zones are denoted in FIG. 5 and 6 by $f-f'$, $g-g'$ and $i-i'$. This is shown once more in FIG. 6 as schematic of the installation of the present invention in a top view. The work stations denoted in FIG. 5 by letters $a-i$, are similarly designated in FIG. 6.

The form carriers coming from storage $i$ are filled at $a$ with a prepared set of form disks 30. Outside main cycle I, if required, an additional spare storage $i'$) is available.

In case the installation is controlled by a programmable electronic process computer, all article-dependent data are stored there. As soon as a form carrier is loaded (taken on) at a, a reading device 26, by means of the address code 16 on the form disk can recognize the article. By means of suitable adjustment drives, controlled by the computer output, the data relevant for the starting work cycle can be set on the form carrier. This may be, for example, the nominal value of a time relay installed in the form carrier for setting the required heating period. Similarly, the same information may be used to select the right blank from a suitable magazine and moving this blank at c into the pick-up device 6 provided for that purpose.

At the end of the injectionlift with freely programmable injection pressure pertaining to the specific article between the press plunger 8 and the back stop 27 at station d, the form is locked by means of closing nut 12. If heat must be supplied to harden the product, it can be obtained in the form of electric energy from current contact bars (bus bars). In this case, the installation of an additional furnace 28 becomes meaningful, in order to reduce heat transfer to the vicinity. However, if this must be forced, it is of advantage to install at this location a suitable cooling aggregate.

After completing the given heating period, the form carrier is ejected from the furnace 28 29. Depending on the composition of the forms, this may be done singly 29 or together with other form carriers 29' – 29'''. This way there are always waiting at the end of the heating channel the articles with the longest heating period and they can thus be overtaken by those with a shorter heating period. Therefore, the length of the entire heating channel 28 must be calculated for the most unfavorable case in the article program where all articles to be produced have a long heating period.

After leaving the heating zone, the form bodies at g between the press cylinder 34 and the back stop 35 are unlocked, so that the loose form disk sets at h can be moved via the ejection device 36 onto the conveying device 37 of cycle II. The empty form carrier travels from there to the magazine i and closes cycle I.

By means of the reading device 26 at k, the form disk package can be conveyed via an aimed control to a suitably arranged mold-removal location 46. After removing the finished article and cleaning out the flash (excess) and similar items, it is moved on a conveying device 38 to a magazine 1, as a tool set again ready for use.

Depending on the priority of the article, one can determine from this storage, upon computer command, the sequence of form disk sets which by combination with a form carrier at a start a new work cycle.

For the sake of greater clarity, in FIG. 6 the width of only one form carrier was used as stroke (lift) value H for the transport step of cycle I. It is, however, meaningful to operate stations a – l in parallel, e.g., three adjacent press plungers at the same time. In this manner, the maximum capacity of the total installation can be increased disproportionally in comparison to the required extra expense.

Accordingly, the economical use of the above described process is, on the one hand, the multiple usage of those parts of the installation necessary for the various work steps and functions. While, as mentioned previously, with the conventional manufacture on a large number of individual aggregates an equal number of devices for opening and closing the form (mold) with (in most cases) several hundred Mp force are required, only one is needed in the process according to the present invention. This shows up to advantage in the installation and energy costs.

On the other hand, there is a lowering of the variable costs without sacrificing flexibility in comparison with the conventional manner of production. This is made possible by the high degree of automation and the resulting lowering of labor cost per article, as well as by low article-related tool costs. Furthermore, the use of a process computer control permits operation of the installation for any order and delivery term situation at an economic optimum.

What is claimed is:

1. A device for the cyclic manufacture of molded parts comprising:
   a. a plurality of forming tools composed of a form carrier and a plurality of article-related mold inserts having cavities for the molding and being shaped for disposition of a plurality thereof in a stack in each mold carrier, the forming tool having conduit means for feeding of material to be molded to the mold insert cavities,
   b. a filling station outfitted with a feeding device for feeding material to the forming tools,
   c. a molding station outfitted with means for pressing the material fed to the forming tools into the cavities of the mold inserts, and means for releasably connecting the forming tools to the pressing means,
   d. an unloading station outfitted with means for removing the mold inserts from the form carriers,
   e. a loading station outfitted with means for filling the form carriers with mold inserts whereby the mold inserts are exchangeable for each working cycle and whereby empty preselected mold inserts can be placed in the mold carriers,
   f. and routing means for routing the molding tools successively through said stations,
   g. the form carriers having a bore for receiving the stack of mold inserts and a pressure actuatable membrane in the bore for receiving a radially acting pressure force and transferring the pressure force to mold inserts formed of radially split segments.

2. The device as defined in claim 1, wherein the mold carrier is provided with an adjustable coding arrangement.

3. The device as defined in claim 1, wherein the mold inserts are formed of radially split segments.

4. The device as defined in claim 1, wherein the mold inserts are formed of two semicircular segments.

5. The device as defined in claim 4, wherein the forming tools comprises conduit means for introduction of fluid into the forming tool to pressurize the pressure actuatable membrane.

6. The device as defined in claim 1, wherein the forming tools cmprises conduit means for introduction of fluid into the forming tool to pressurize the pressure actuatable membrane.

7. The device as defined in claim 6, wherein the mold inserts are formed of radially split segments.

* * * * *